(12) United States Patent
Suresh (10) Patent No.: US 10,601,954 B2
(45) Date of Patent: Mar. 24, 2020

(54) SANDBOXING REQUESTS FOR WEB SERVICES

(71) Applicant: Microsoft Technology Licensing, LLC, Redmond, WA (US)

(72) Inventor: Suneel Suresh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 15/916,901

(22) Filed: Mar. 9, 2018

(65) Prior Publication Data

US 2019/0281134 A1    Sep. 12, 2019

(51) Int. Cl.
*H04L 29/08* (2006.01)
*G06F 11/34* (2006.01)
*G06F 9/50* (2006.01)
*H04L 12/26* (2006.01)

(52) U.S. Cl.
CPC .......... *H04L 67/327* (2013.01); *G06F 9/5027* (2013.01); *G06F 11/3409* (2013.01); *H04L 43/08* (2013.01)

(58) Field of Classification Search
None
See application file for complete search history.

(56) References Cited

U.S. PATENT DOCUMENTS

| | | | |
|---|---|---|---|
| 7,171,470 B2 | 1/2007 | Doyle et al. | |
| 7,870,568 B2 | 1/2011 | Bernardin et al. | |
| 2005/0177635 A1 | 8/2005 | Schmidt et al. | |
| 2006/0294238 A1 | 12/2006 | Naik et al. | |
| 2009/0150565 A1* | 6/2009 | Grossner | G06F 9/468 709/241 |
| 2014/0173594 A1 | 6/2014 | Ng et al. | |
| 2014/0365626 A1 | 12/2014 | Radhakrishnan et al. | |
| 2015/0180732 A1* | 6/2015 | Peng | H04L 41/50 709/223 |
| 2016/0379125 A1 | 12/2016 | Bordawekar et al. | |
| 2018/0020024 A1 | 1/2018 | Chao et al. | |

* cited by examiner

*Primary Examiner* — Brian Whipple
(74) *Attorney, Agent, or Firm* — Joseph R. Kelly; Kelly, Holt & Christenson, PLLC (57) ABSTRACT

A web service request is received, and a stored performance metric value, generated for other web service requests of the same type, is compared to a threshold value. If the stored performance metric value meets the threshold value, then the received web service request is routed to a sandboxed instance of the web service for execution. If the stored performance metric value does not meet the threshold value then the received web service request is routed to a default web service instance for execution. In either case, the performance metric is monitored during execution of the received web service request, and the stored performance metric value is updated based upon the monitored performance metric generated for the received web service request.

20 Claims, 6 Drawing Sheets

SANDBOXING REQUESTS FOR WEB SERVICES

BACKGROUND

Computing systems are currently in wide use. Some computing systems are deployed in a remote server environment where they host services which can be accessed by various different client computing systems. The client computing systems or other computing systems make requests to the services that are hosted at the remote server environment (e.g., in the cloud). For instance, services may be hosted in a data center, or in another remote server environment.

It is not uncommon, in such computing systems, for computing system resources to be assigned to one or more different instances of the service being hosted. For example, an instance of a service being hosted may be assigned a certain level of central processing unit (CPU) resources, or physical processors, it may be assigned certain memory resources (e.g., blocks of virtual or physical memory or a certain amount of memory) or other computing system resources.

In rendering the service, the computing system often responds to a very large number of requests from a variety of different applications or clients. It may be that one or more of the requests can degrade the quality of service at the expense of other requests. For instance, it may be that an application or user is making an unusually high volume or number of requests to the hosted service. Similarly, a request may consume an inordinate amount of computing system resources (such as CPU resources, memory resources, etc.). When these requests are being serviced, they can affect the performance of the service in responding to other requests that do not exhibit these characteristics. When more of these types of requests are received (the type that deleteriously affect the performance of the service), this can cause an overall drop in reliability that, over time, can even cause the web service to deteriorate progressively. Thus, eventually, these types of requests (that consume an inordinately large amount of resources, or that are received at an inordinately high volume, triggering a buggy code path, etc.) can affect the other requests and can even deleteriously affect the performance of the service overall.

The discussion above is merely provided for general background information and is not intended to be used as an aid in determining the scope of the claimed subject matter.

SUMMARY

A web service request is received, and a stored performance metric value, generated for other web service requests of the same type, is compared to a threshold value. If the stored performance metric value meets the threshold value, then the received web service request is routed to a sandboxed instance of the web service for execution. If the stored performance metric value does not meet the threshold value, then the received web service request is routed to a default web service instance for execution. In either case, the performance metric is monitored during execution of the received web service request, and the stored performance metric value is updated based upon the monitored performance metric generated for the received web service request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
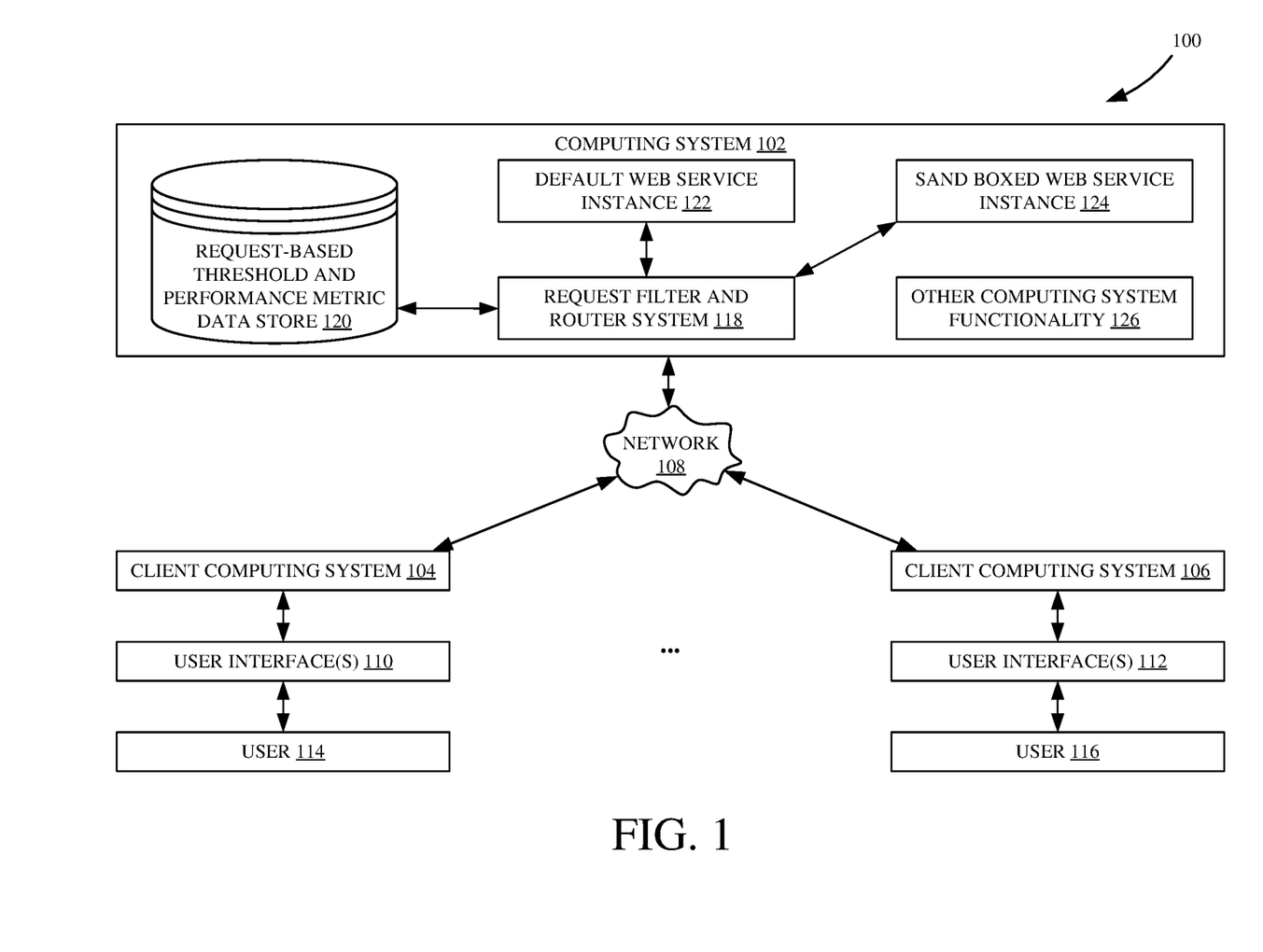
FIG. 1 is a block diagram of one example of a computing system architecture.

FIG. 1 is a block diagram of one example of a computing system architecture 100. Architecture 100 shows computing system 102 connected to a plurality of different client computing systems 104-106 over network 108. Computing system 102 illustratively hosts a web service that can be accessed by client computing systems 102-106 over network 108. Therefore, in one example, network 108 is a wide area network, a local area network, a cellular communication network, a near field communication network, or any of a wide variety of other networks or combinations of networks.

FIG. 1 also shows that, in one example, client computing systems 104-106 generate user interfaces 110-112, respectively, for interaction by users 114-116. Users 114-116 illustratively interact with user interfaces 110-112 in order to control and manipulate client computing systems 104-106, respectively, and in order to interact with the service hosted by computing systems 102. In doing so, client computing systems 104-106 can generate web service requests (based on user inputs from users 114-116, or otherwise), and submit those requests to computing system 102. The web service requests are illustratively requests that are to be executed by the hosted web service.

In the example shown in FIG. 1, computing system 102 illustratively includes request filter and router system 118, request-based performance metric and threshold data store 120 (which can include a database, memory, etc.), default web service instance 122, sandboxed web service instance 124, and it can include a wide variety of other computing system functionality 126. In one example, request filter and router system 118 groups the requests it receives from client computing systems 104-106 into groups based on a variety of different grouping criteria and grouping rules. The grouping criteria can include such things as the source of the request (e.g., the application ID, the user ID, etc.), the type of request (e.g., the type of operation to be executed in executing the request), the requested resource, among other things. Grouping rules specify that requests that have certain criteria or combinations of criteria in common, are to be grouped into groups. Then, performance criteria corresponding to the requests in the various groups are monitored by system 118. The performance criteria can include a wide variety of criteria, such as request-response latency, the volume or frequency of this type of request, the amount of CPU or memory usage consumed by this type of request, among other criteria. The values for the different performance metrics, corresponding to each group of requests, is stored in data store 120 and updated as different requests, corresponding to each given group, are received and executed on computing system 102. Thresholds for the different criteria are also received (or generated) and stored in request-based performance criteria and threshold data store 120.

Once the rules for the groups of requests are established, and the performance metric values for a number of different samples of each group of requests have been monitored and stored in data store 120, and once the threshold values are stored, then, when a new request is received, request filter and router system 118 accesses the grouping rules and identifies the particular group that it belongs to (if any) and accesses the performance metrics and thresholds for that group. It compares the performance metric values for the group to the corresponding threshold values to determine whether this group of requests is inordinately, deleteriously affecting the performance of the service. If so, it can send the request to the sandboxed web service instance 124, where its execution will not affect (in terms of performance) the web service request being executed (on different data) in default web service instance 122.

In one example, the comparison of the performance metric values to the threshold values can indicate an inordinate deleterious affect if the performance metric values meet, or exceed, the threshold values. For instance, it may be that the detected CPU usage when executing web service requests in this group normally exceeds a threshold value of CPU usage set for requests in this group. The same may be true of memory usage and/or latency or other performance metrics. These are only examples.

Also, in one example, the computing system resources assigned to default web service instance 122 are much larger than the computing system resources assigned to sandboxed web service instance 124. For instance, the CPU resources, the memory resources, and the other computing system resources assigned to sandboxed web service instance 124 may be 5% or 10% of those assigned to default web service instance 122. Regardless of how large the amount of resources assigned to instance 124, relative to those assigned to instance 122, it will be appreciated that the resources assigned to sandboxed web service instance 124 are separated from those assigned to default web service instance 122 so that, when a service request is executed in sandboxed web service instance 124, its execution will not affect the performance of default web service instance 122 in the execution of any other web service requests (on other data). By way of example, if the web service request being executed in sandboxed web service instance 124 is consuming a large amount of CPU resources, so that it has a relatively high request-response latency, this will not affect the request-response latency of the web service requests being executed at default web service instance 122. This is just one example of how the resources are separated.

Figure 2:
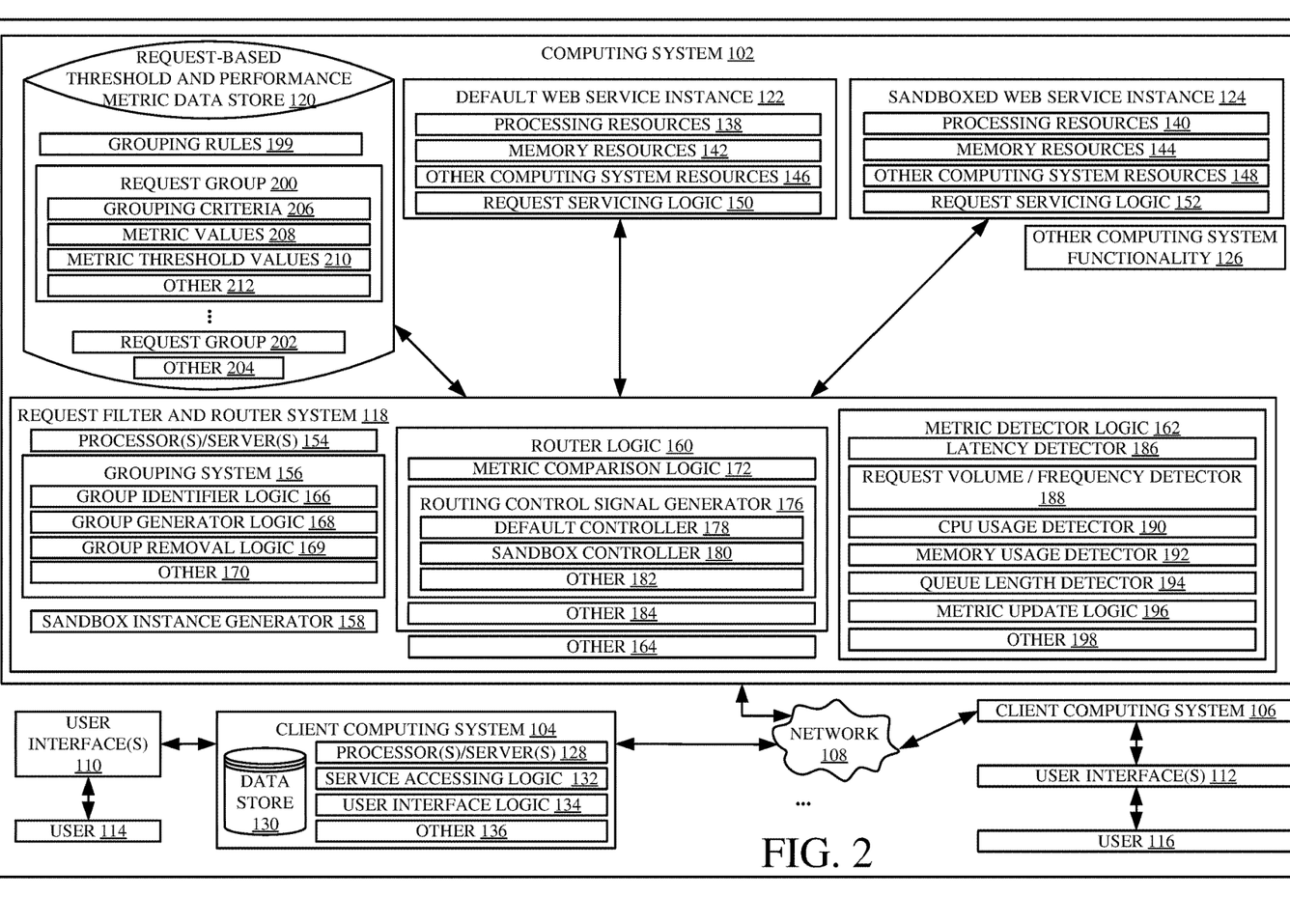
FIG. 2 is a block diagram showing one example of the computing system architecture illustrated in FIG. 1, in more detail.

FIG. 2 is a block diagram showing one example of the computing system architecture 100, illustrated in FIG. 1, in more detail. Some of the items shown in FIG. 2 are similar to those shown in FIG. 1, and they are similarly, numbered.

Client systems 104-106 can be similar, or different. For purposes of the present description, it will be assumed that they are similar, so that only a more detailed description of client computing system 104 is provided. Client computing system 104 illustratively includes one or more processors or servers 128, data store 130, service accessing logic 132, user interface logic 134, and it can include a wide variety of other items 136. User interface logic 134 illustratively generates user interfaces 110 and detects user interaction with interfaces 110. It can provide an indication of these interactions to other items in client computing system 104, or elsewhere. Service accessing logic 132 illustratively includes functionality used when client computing system 104 interacts with the service hosted by computing system 102. It can be a client component of that service, or another set of logic that is used to interact with the service.

FIG. 2 also shows that both default web service instance 122 and sandboxed web service instance 124 are illustratively assigned processing resources 138, 140, memory resources 142, 144, and they can be assigned a wide variety of other computing system resources 146, 148 that are used in executing service requests received form system 118. Default web service instance 122 includes request servicing logic 150 that can be implemented using the processing resources 138, memory resources 142 and other computing system resources 146. Request servicing logic 150 is illustratively the logic that makes up the service being hosted, so that logic 150 receives web service requests that are sent to it from system 118 and processes those requests and generates responses to those requests. The responses can be sent back to the requesting client computing system 104-106 through a communication component that communicates over network 108, or through any other computing system functionality 126.

FIG. 2 shows that sandboxed web service instance 124 also illustratively includes request servicing logic 152. Logic 152 is illustratively the same as logic 150 so that sandboxed web service instance 124 can service the same web service requests as default web service instance 122. Logic 152 can be implemented using the processing resources 140, memory resources 144 and other computing system resources 148 that are assigned to sandboxed web service instance 124.

As discussed above, the computing system resources that are assigned to each of the instances 122-124 can be assigned by an administrator or another person who has access to computing system 102 which will allow that person to assign computing resources to different instances. As also mentioned above, the computing system resources assigned to sandboxed web service instance 124 may be significantly smaller than those assigned to default web service instance 122, because it is contemplated that sandboxed web service instance 124 will likely service fewer requests than instance 122. However, the example in which the resources assigned to instance 124 are smaller than those assigned to instance 122 is only one example. In either case, the computing system resources are illustratively separated from one another so that the performance in executing web service requests in one instance 122, 124 will not affect the performance in executing web service requests in the other instance 122, 124.

Request filter and router system 118 illustratively includes one or more processors or servers 154, grouping system 156, sandbox instance generator 158, router logic 160, metric detector logic 162, and it can include a wide variety of other items 164. Request grouping logic 156, itself, illustratively includes group identifier logic 166, group generator logic 168, group removal logic 169 and it can include other items 170. Router logic 160 can include metric comparison logic 172, routing control signal generator 174 (which, itself, includes default controller 178, sandbox controller 180, and can include other items 182), and it can include other items

184. It will be noted that controllers 178 and 180 can be the same or different controllers, as is described in more detail below.

Metric detector logic 162 illustratively includes latency detector 186, request volume/frequency detector 188, CPU usage detector 190, memory usage detector 192, queue length detector 194, metric update logic 196, and it can include other items 198.

Request-based threshold and performance metric data store 120 illustratively includes grouping rules 199 that specify how requests are to be grouped (based on a set of grouping criteria), and data for a plurality of request groups 200-202. It can include other items 204 as well. Each request group illustratively includes grouping criteria 206, metric values 208, and metric threshold values 210. Each request group can include other items 212 as well.

Before describing the overall operation of architecture in more detail, a brief overview of some of the items in request filter and router system 118, and their operation, will first be described. Sandbox instance generator 158 illustratively includes functionality that allows an administrator or another person to generate a sandboxed web service instance 124. It allows the assignment of the various computing system resources shown in instance 124, to the sandboxed service web instance. It can also include logic that automatically generates another sandboxed web service instance 124 and assigns resources to it, or assigns additional resources to instance 124, when needed. It will also be noted that sandbox instance generator 158 can automatically generate additional sandboxed web service instances 124 and assign resources to them, under certain criteria. Some of those will be described in more detail below. By automatically, it is meant that the process or steps are performed without additional user or administrator involvement, except perhaps to initiate or authorize the process steps.

When system 118 receives a web service request over network 108, grouping system 156 accesses grouping rules 199 to determine whether the currently received request belongs to a request group 200-202 that is specified by the rules. The request groups are formed based on rules that specify various grouping criteria 206 that can be used to identify which particular group a newly incoming request belongs to. The rules can be pre-configured by a user or administrator using grouping system 156, or they can be generated or updated on-the-fly. They can also be removed by group removal logic 169. The grouping criteria can include the type of request, the source of the request (e.g., the user, the application, etc.), the requested resources, or other criteria. When a request is received, group identifier logic 166 determines whether there is a rule that would group the request into a group and, if so, filters the request groups 200-202 in store 120, based on the rules and grouping criteria, to identify the group to which the newly received request belongs.

An example may be helpful. Assume two grouping rules 199 have been input (by a user or otherwise) as follows:

Rule A: Group #1 into "operation", "user Agent"
Rule B: Group #2 into "operation", "Application"

These rules specify that all requests that have a same operation and user agent are to be grouped together, and all requests that have the same operation and requesting application are to be grouped together. Now assume that the following requests have been received, sequentially:

10 incoming requests have "Operation as Read", "User-Agent as AcmeMobile", "Application as email"
5 incoming requests have "Operation as Read", User-Agent as AcmeDesktop", Application as email"
20 incoming requests have "Operation as Update", "User-Agent as Beta", "Application as Maps"

Then, based on Rule A, a group with criteria "Read", AcmeMobile" will have 10 entries and the metric values for that group will be based on the metric values for each entry in the group (e.g., an average of each metric taken over the entries in the group).

Also, based on Rule A, another group with criteria "Read", "AcmeDesktop" will have 5 entries with metric values based on those entries. Yet another group with criteria "update", "Beta" will have 20 entries with corresponding metric values.

Based on Rule B, a group with criteria "Read", "Email" will have 15 entries. Another group with criteria "Update", "Maps" will have 20 entries.

If group identifier logic 166 determines that there are no rules 199 specifying a group for the newly received request, as is described below, metric detector logic 162 then begins monitoring the various performance metrics during execution of that request. A group can be created for it by modifying the grouping rules 199. It can store and updates metric values for the request. It can also illustratively establish or receive metric threshold values 210 if a group is specified or the metric threshold values 210 can be pre-defined or set by an administrator, or otherwise set.

Also, if no group was identified for the currently received request, then router logic 160 sends the currently received request to the default web service instance 122 for execution. However, if it was determined by group identifier logic 166 that the currently received request belongs to a request group 200-202 for which a record has already been generated, then metric comparison logic 172 determines whether enough data has been collected by metric detector logic 162 for the various metric values 208 in the identified request group to make a valid threshold comparison. If so, it compares the metric values 208 that have been collected for the group to which the newly received request belongs, to the metric threshold values 210 for those metrics. If the metric values for the group exceed the threshold values 210, then comparison logic 172 generates a comparison signal indicative of this.

Based on that signal, routing control signal generator 176 generates control signals to route the request to the proper instance 122-124. When the comparison signal indicates that the comparison shows this request to belong to a problematic request group, (e.g., if the CPU usage metric value meets or exceeds the CPU usage threshold value, etc.) then sandbox controller 180 generates control signals to send the request to sandboxed web service instance 124, for execution. When the newly received request belongs to a group that is not problematic (e.g., the metric values 208 for the group to which the newly received request belongs, do not meet the metric threshold values 210) then default controller 178 generates control signals to send the newly received request to default web service instance 122. Controllers 178 and 180 can be the same piece of logic, or they can be different.

In either case, metric detector logic 162 monitors the various performance metrics to obtain values corresponding to the execution of the newly received request. It then updates the metric values 208 in the group to which the newly received request belongs, once execution of that request has been completed. By way of example, latency detector 186 monitors the request-response latency for the newly received request. Request volume/frequency detector 188 detects the number of requests that belong to the present group that have been received, and/or the frequency with which they are received over a given period of time, or relative to requests belonging to other groups. CPU usage detector 190 identifies a level of CPU usage that was consumed during execution of the request. Memory usage detector 192 identifies a level of memory that was consumed during execution of the request. Queue length detector 194 identifies a length of the various queues that are used in executing the request. A wide variety of other metrics can be monitored as well. It will also be noted that, in one example, metric detector logic 162 can perform detection or monitoring at different levels depending on whether the web service request was executed in default web service instance 122 or sandboxed web service instance 124. For instance, more general metric detection can be performed when the request is executed in instance 122. However, when the request has been identified as a potentially problematic request, so that it is executed in sandboxed web service instance 124, then additional metrics may be detected, the metrics may be detected at a more granular level, or other more detailed metric detection can be performed by metric detector logic 162. These are only examples.

Metric update logic 196 updates the metric values 208 in the group to which the newly received request belongs, once that request has been executed (whether it was executed by default web service instance 122 or sandboxed web service instance 124).

Figure 3A:
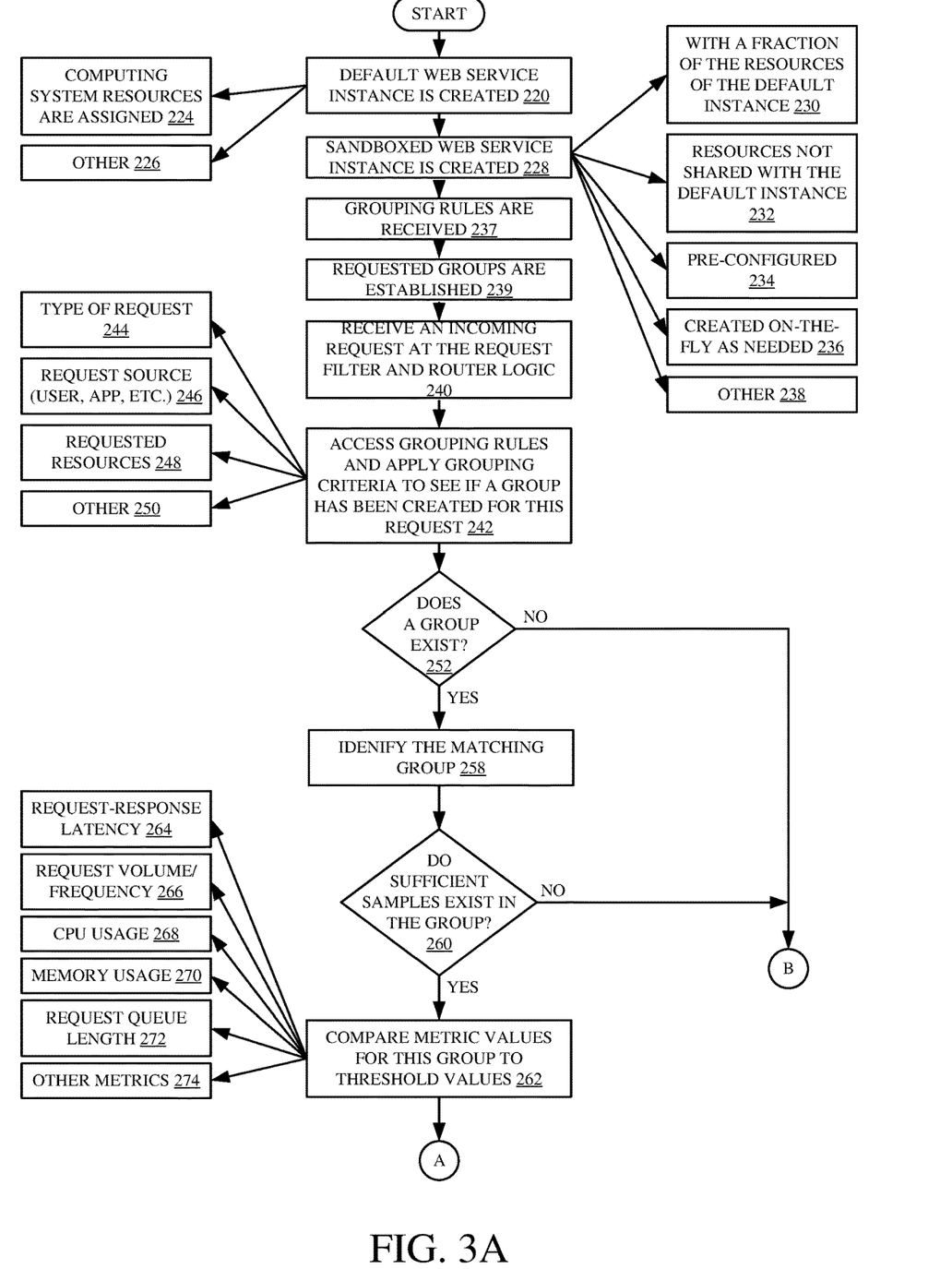
FIGS. 3A and 3B (collectively referred to herein as FIG. 3) show a flow diagram illustrating one example of the operation of the architecture illustrated in FIGS. 1 and 2.
Figure 3B:
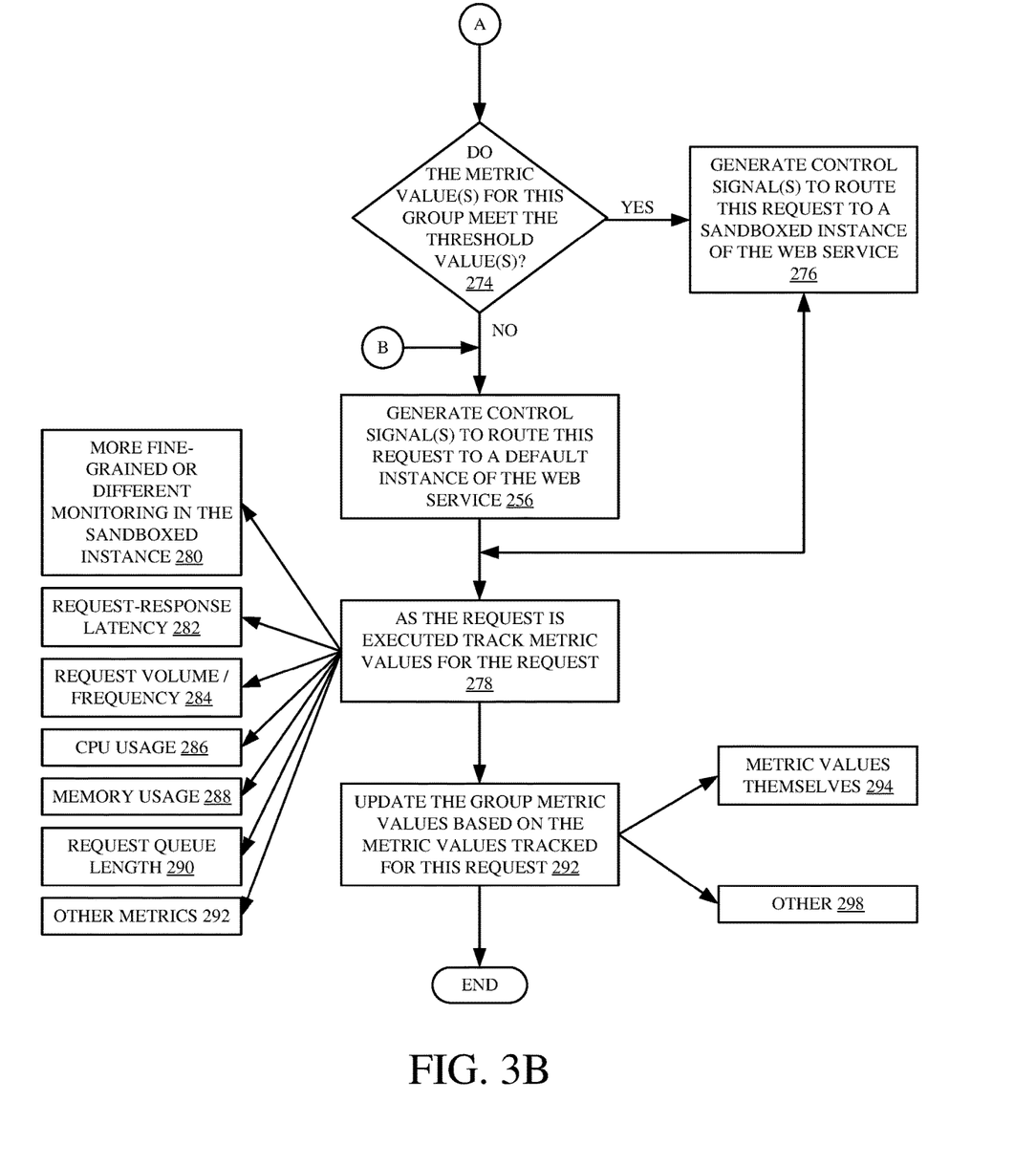

FIGS. 3A-3B (collectively referred to herein as FIG. 3) show one example of a flow diagram illustrating the operation of computing system 102 in executing a web service request by routing it to default web service instance 122 or sandboxed web service instance 124, based upon how its corresponding metric values compare to the metric threshold values for the group of similar requests. FIGS. 2 and 3 will now be described in conjunction with one another.

It is first assumed that both the default web service instance 122 and the sandboxed web service instance 124 have been created. This can be done automatically, on-the-fly, or based on user or administrator inputs. Creating the default web service instance 122 is indicated by block 220 in the flow diagram of FIG. 3. Creation of instance 122 will include assigning it the computing system resources as indicated by block 224. The resources can include any of the resources 138, 142, 146 described above, or other resources 226.

Creating the sandboxed web service instance 124 is indicated by block 228 in the flow diagram of FIG. 3. As discussed above, the computing resources 140, 144, 148 assigned to the sandboxed web service instance 124 may be a fraction of those assigned to the default web service instance 122. This is indicated by block 230 in the flow diagram of FIG. 3. Also, in one example, the computing system resources assigned to instance 124 are not shared with those assigned to instance 122. This is indicated by block 232, and is done so that the execution of service requests in sandboxed web service instance 124 will not affect the performance of executing other service requests in default web service instance 122.

It may be that the computing system resources 140, 144, and 148 that are assigned to the sandboxed web service instance 124 are preconfigured. For instance, the amount of resources may be preconfigured, the particular resources that are assigned may be preconfigured or the resources may be preconfigured in other ways as well. This is indicated by block 234. In another example, the sandboxed web service instance 124 may be created on-the-fly, as needed. For instance, sandbox instance generator 158 may generate and/or delete additional sandboxed web service instances 124 as they are needed, based upon the number of requests being sent to the sandboxed web service instances 124 that are already created. Creating and/or deleting them on-the-fly is indicated by block 236 in the flow diagram of FIG. 3. The sandboxed web service instance 124 can be created in other ways as well, and this is indicated by block 238.

If they are not already received, grouping rules 199 are then received and group generator logic 168 creates records in the data store 120 for the request groups 200-202 defined by rules 199. This can be done on-the-fly, as requests are received as well. Receiving the grouping rules 199 and generating the records for the request groups are indicated by blocks 237 and 239, respectively.

Request filter and router system 118 then receives an incoming service request from a client computing system (e.g., from system 104). This is indicated by block 240 in the flow diagram of FIG. 3. In one example, the request will be a service request, from a web application, that is to be executed by a service instance on computing system 102.

Grouping system 156 then accesses grouping rules 199 and applies the grouping criteria (e.g., grouping criteria in rules 199 that define groups) to determine whether the newly received request belongs to one of the request groups 200-202 that have been generated in data store 120. This is indicated by block 242 in the flow diagram of FIG. 3.

The grouping criteria in the grouping rules 199, that define the request groups 200-202, can take a wide variety of different forms. For instance, they can include the type of request 244. The service request may be, for instance, a SOAP call, it can have an action name, it can be a particular method call, it can identify a particular action that is to be taken or executed, or it can include a wide variety of other identifiers that identify the type of request.

The grouping criteria can also include the request source 246. By way of example, the source of the request may be identified by a user ID that identifies the particular user that initiated the request. It can be an application identifier that identifies the application (e.g., the client application or other application) that initiated the request. The request source can be identified in other ways as well.

The grouping criteria can include an identifier that identifies the requested resources. This is indicated by block 248. For instance, when a request requests a specific resource or type of resource, or requests that a particular action be taken on a particular resource, then this may be grouped with other requests that request the same resources. The grouping criteria can include a wide variety of other criteria as well, and this is indicated by block 250.

Group identifier logic 166 then determines, by applying the criteria in the different rules 199 to the newly received service request, whether a group exists for this service request. For instance, it identifies the particular grouping criteria for the various request rules 199 that define groups 200-202 and determines whether the current service request has criteria that match up with the grouping criteria in the rules (that define the particular request groups). Determining whether the current request belongs to a group that already exists in data store 120 is indicated by block 252. If not, processing then reverts to block 256 where router logic 160 uses default controller 178 to generate control signals that route the currently received service request to default web service instance 122. The request servicing logic 150 in default web service instance 122 then uses the various computing system resources 138, 142 and 146, that have been assigned to instance 122, to execute the web service request.

If, at block 252, it is determined that the present web service request does belong to a request group 200-202 that has already been created, then group identifier logic 166 identifies the matching group (the request group 200-202) that has grouping criteria 206 that match the newly received web service request. Identifying the matching group is indicated by block 258 in the flow diagram of FIG. 3.

Metric comparison logic 172 then determines whether the particular request group that was identified by group identifier logic 166 (the group to which the newly received web service request belongs) has sufficient samples for the metric values 208 to do a threshold comparison. Determining whether sufficient samples exist is indicated by block 260. The number of examples that are sufficient in order to do a threshold comparison may be predefined. It may also be defined dynamically or on-the-fly. Also, the number of samples that are needed may vary depending on the request group to which the current request belongs. For example, it may vary based on the type of request or based on any of the other grouping criteria. The number of samples needed may vary in other ways as well.

If there are not a sufficient number of samples for the metric values 208, then processing again reverts to block 256 where the request is routed to the default web service instance 122 for execution. The metric values are then monitored and stored in data store 120, as is described below.

If, at block 260, it is determined that a sufficient number of samples for the identified request group do exist in data store 120, then metric comparison logic 172 compares the metric values 208 for the request group 200 to which the present request belongs, to the metric threshold values 210 for those metrics. This is indicated by block 262 in the flow diagram of FIG. 3. Again, the particular metrics that are tracked, and that have threshold values can vary widely. They can include, for instance, the request-response latency 264. They can include the request volume or frequency 266. They can include the level of CPU usage 268, the level of memory usage 270, the length of the request queues 272, or they can include a wide variety of other metrics 274. Again, the threshold values can be predefined, they can vary dynamically, they can change based upon the particular metric being compared, or they can be established in other ways as well.

Metric comparison logic 172 then generates a comparison signal indicative of the comparison, and thus indicative of whether the request should be sandboxed. This is indicated by block 274 and can be done in a wide variety of ways. For instance, it may be that if a single metric value meets its corresponding threshold value, this is enough to trigger a yes response at block 274. It may be that more than one metric value needs to meet the threshold value. It may be that certain metric values are weighted higher than other metric values in doing the comparison. All of these and other comparison techniques are contemplated herein. Regardless of the comparison technique, it will be assumed that, if the metric values meet or exceed the threshold values, then this indicates that the newly received web request belongs to a request group that has exhibited problematic performance, or performance that may affect the performance of other web service requests that belong to other request groups, or another type of performance that indicates that the newly received web service request should be sandboxed during its execution. Thus, sandbox controller 180 then generates control signals to route this web service request to sandboxed web service instance 124. This is indicated by block 276. Request servicing logic 152 then uses the various computing resources 140, 144 and 148 that have been assigned to the sandboxed instance 124 in order to execute the web service request and respond to it.

If, at block 274, metric comparison logic 172 determines that the metric values, for the request group to which the newly received web request belongs, do not meet their threshold values, then processing again continues at block 256 where default controller 178 generates control signals to route this request to the default web service instance 122 where it will be executed and respond to. Again, controllers 178 and 180 may be a single routing controller that routes the request to the different instances, or they can be different controllers.

Regardless of whether the web service request is executed in the default web service instance 122 or the sandboxed web service instance 124, metric detector logic 162 detects values for the various metrics that are being monitored for this request group, and updates the metric values 208 in data store 120, with the new sample of metric values obtained for the newly received web request. Tracking the metric values for the newly received web service request, as it is being executed, is indicated by block 278 in the flow diagram of FIG. 3. The monitoring mechanisms used by metric detector logic 162 may be the same for requests executed in instance 122 and those executed by instance 124, or they may be different based upon the particular instance where the request is executed. For example, the monitoring mechanisms may be more fine-grained or otherwise different when the request is executed in the sandboxed instance 124 than when it is executed in the default instance 122. This is indicated by block 280.

Also, the particular metric values that are tracked may vary widely, based upon the request, or based upon a wide variety of other criteria. As discussed above with respect to block 262, they can include the request-response latency 282 (as detected by latency detector 186), the request volume/frequency 284 (as detected by request volume/frequency detector 188), the level of CPU usage 286 (as detected by CPU usage detector 190), the level of memory usage 288 (as detected by memory usage detector 192), the request queue length 290 (as detected by queue length detector 194), or they can include a wide variety of other metrics 292.

Once the new samples for the various metrics have been obtained for the execution of the newly received web service request, metric update logic 196 updates the particular metric values 208 in data store 120 for the identified request group. This is indicated by block 292. By way of example, it may be that metric update logic 196 calculates a rolling average for each of the metric values 208 in the request group 200 (to which the web service request that was just executed belongs). It may be that it keeps a median value, an average value, or another value for each of the metrics. Also, it may be that metric update logic 196 just updates the metrics values 208, themselves. This is indicated by block 294. However, it may also update the metric threshold values 210. By way of example, if the request group to which the present request belongs is a relatively new request group, then metric update logic 196 may update an expected level for the metric threshold value based upon the current sample value. In another example, the threshold values are updated manually. In yet another example, the thresholds are set using a machine learning system and can be intermittently updated off line or on-the-fly, by re-training based on past performance data. Updating the metric values can be done in a wide variety of different ways as well. This is indicated by block 298.

It can thus be seen that the present discussion provides an improvement in the operation of the computing system itself. It automatically identifies similar types of web service requests and groups them together, and then monitors their performance. If certain groups of requests are identified as being problematic, they are automatically routed to a sandboxed instance of the web service where they are executed. Their execution in the sandboxed instance will not affect the execution of the other web service requests that are executed in the default instance. Thus, the present system automatically isolates certain types of web service requests that can be problematic, and automatically executes them in a sandboxed environment where they cannot degrade the performance of the system in responding to other web service requests.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
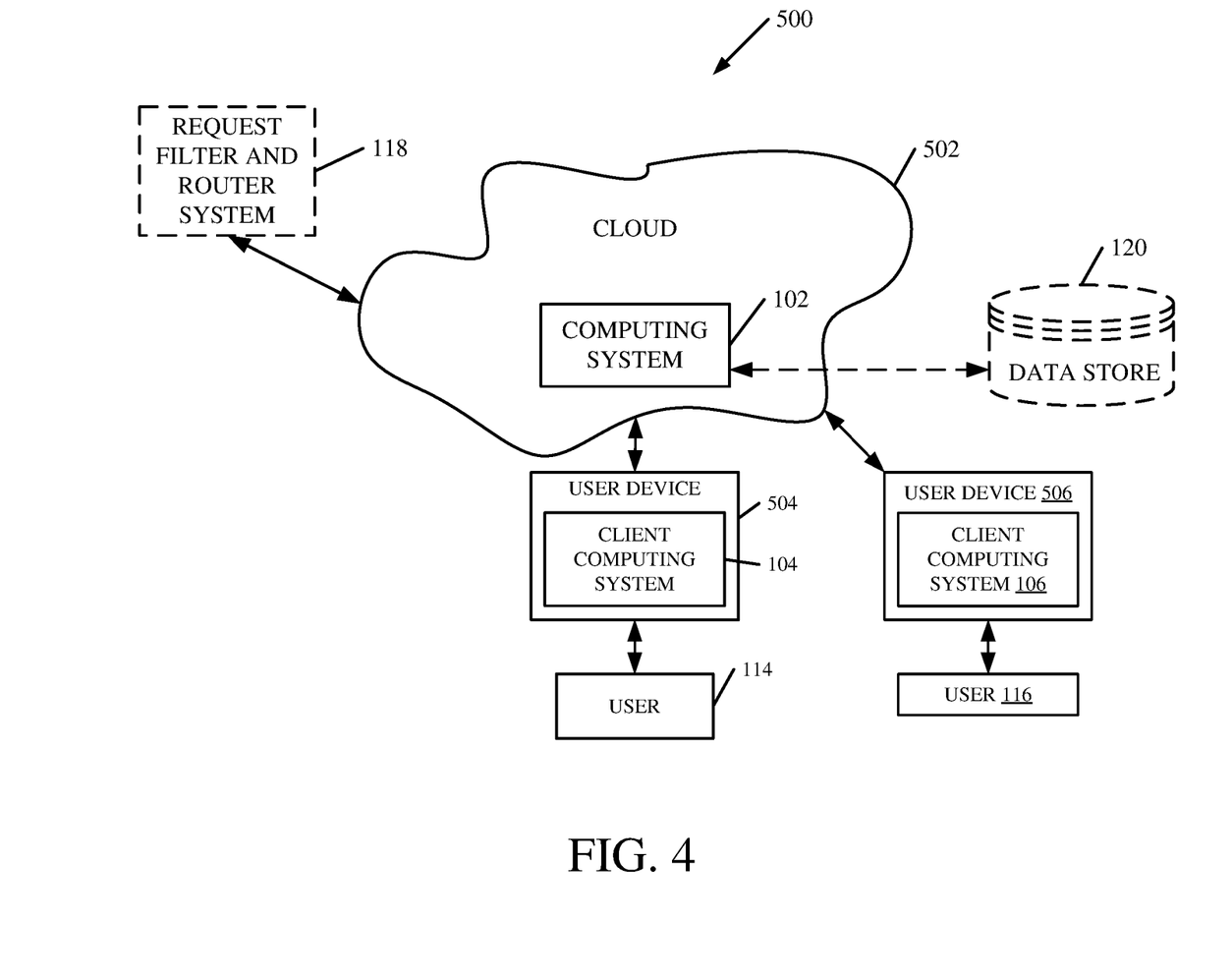
FIG. 4 is a block diagram showing one example of the computing system architecture illustrated in FIGS. 1 and 2, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that computing system 102 can be located in cloud 502 (which can be public, private, or a combination where portions are public while others are private). Therefore, users 114-116 use user devices 504-506 to access those systems through cloud 502.

FIG. 4 also depicts another example of a cloud architecture. FIG. 4 shows that it is also contemplated that some elements of computing system 102 can be disposed in cloud 502 while others are not. By way of example, data store 120 can be disposed outside of cloud 502, and accessed through cloud 502. In another example, request filter and routing system 118 (or other items) can be outside of cloud 502. Regardless of where they are located, they can be accessed directly by devices 504-506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
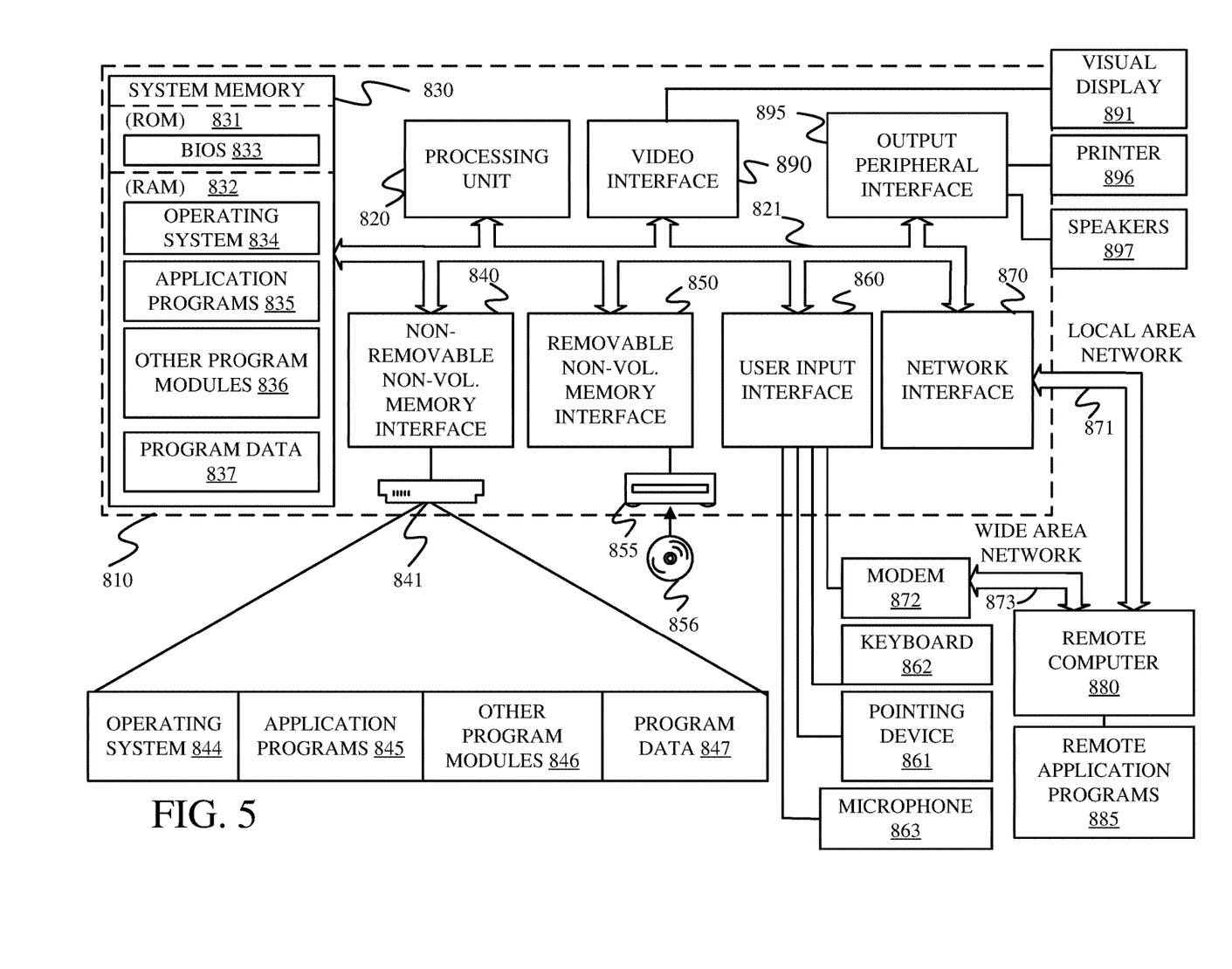
FIG. 5 is a block diagram showing one example of a computing environment that can be used in the architectures shown in the previous figures.

FIG. 5 is one example of a computing environment in which architecture 100, or parts of it, (for example) can be deployed. With reference to FIG. 5, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 5.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 5 illustrates operating system 834, application programs 835, other program modules 836, and program data 837.

The computer 810 may also include other removable/non-removable volatile/nonvolatile computer storage media. By way of example only, FIG. 5 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 5, provide storage of computer readable instructions, data structures, program modules and other data for the computer 810. In FIG. 5, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 5 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 5 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:

request group identifier logic that receives a service request for a web service and identifies a request group, of a plurality of different request groups, to which the service request belongs, based on a set of grouping criteria;

metric comparison logic that compares a performance metric value corresponding to the identified request group to a metric threshold value and that generates a comparison signal indicative of a result of the comparison; and a routing controller that generates a default instance control signal to send the service request to a first web service instance for execution when the comparison signal has a first value, the first web service instance having a first set of assigned computing system resources that implement request servicing logic configured to respond to the service request, and that generates a sandbox instance control signal to send the service request to a second web service instance for execution when the comparison signal has a second value, the second web service instance having a second set of assigned computing system resources that is different from, and smaller than, the first set of assigned computing system resources, the second set of assigned computing system resources implementing the request servicing logic that is configured to respond to the service request.

Example 2 is the computing system of any or all previous examples and further comprising:

metric detector logic configured to detect a value of the performance metric corresponding to execution of the service request.

Example 3 is the computing system of any or all previous examples wherein the metric detector logic comprises:

metric update logic configured to update the performance metric value corresponding to the identified request group based on the detected value of the performance metric corresponding to execution of the service request.

Example 4 is the computing system of any or all previous examples wherein the metric comparison logic is configured to compare a plurality of different performance metric values corresponding to the identified request group to a plurality of different, corresponding metric threshold values and generate the comparison signal based on results of the comparisons.

Example 5 is the computing system of any or all previous examples wherein the metric detector logic comprises a plurality of different metric detectors each configured to detect a different one of the plurality of different performance metric values corresponding to execution of the service request.

Example 6 is the computing system of any or all previous examples wherein the metric update logic is configured to update the plurality of different performance metric values corresponding to the identified request group based on the plurality of different detected performance metric values corresponding to execution of the service request.

Example 7 is the computing system of any or all previous examples and further comprising the first and second web service instances, wherein the first and second sets of assigned computing system resources are configured so that execution of the service request, that operates on a first portion of data, on the first web service instance is unaffected by execution of another service request, that operates on a different portion of data, on the second web service instance.

Example 8 is the computing system of any or all previous examples and further comprising:

a sandbox instance generator configured to automatically generate additional web service instances, each with an additional set of assigned computing system resources that is different from, and smaller than, the first set of computing system resources.

Example 9 is the computing system of any or all previous examples and further comprising:

request grouping logic configured to access a set of grouping rules and generate the plurality of different request groups by applying the grouping rules in each of the grouping rules to received service requests to identify sets of similar service requests based on the grouping criteria and generating a request group for each set of similar service requests.

Example 10 is the computing system of any or all previous examples wherein the request grouping logic is configured to generate an additional grouping rule that defines an additional request group when the request group identifier logic identifies that a service request is received that does not belong to a request group, based on the grouping criteria.

Example 11 is a computer implemented method, comprising:

receiving a service request for a web service;

identifying a request group, of a plurality of different request groups, to which the service request belongs, based on a set of grouping criteria;

comparing a performance metric value corresponding to the identified request group to a metric threshold value and generating a comparison signal indicative of a result of the comparison;

generating a default instance control signal to send the service request to a first web service instance for execution when the comparison signal has a first value, the first web service instance having a first set of assigned computing system resources that implement request servicing logic configured to respond to the service request; and generating a sandbox instance control signal to send the service request to a second web service instance for execution when the comparison signal has a second value, the second web service instance having a second set of assigned computing system resources that is different from, and smaller than, the first set of assigned computing system resources, the second set of assigned computing system resources implementing the request servicing logic that is configured to respond to the service request.

Example 12 is the computer implemented method of any or all previous examples and further comprising:

detecting a value of the performance metric corresponding to execution of the service request; and updating the performance metric value corresponding to the identified request group based on the detected value of the performance metric corresponding to execution of the service request.

Example 13 is the computer implemented method of any or all previous examples wherein comparing comprises:

comparing a plurality of different performance metric values corresponding to the identified request group to a plurality of different, corresponding metric threshold values and wherein generating the comparison signal comprises generating the comparison signal based on results of the comparisons.

Example 14 is the computer implemented method of any or all previous examples wherein detecting a value of the performance metric comprises detecting a plurality of different performance metric values corresponding to execution of the service request and wherein updating the performance metric value corresponding to the identified request group comprises updating a plurality of different performance metric values corresponding to the identified request group based on the plurality of different detected performance metric values corresponding to execution of the service request.

Example 15 is the computer implemented method of any or all previous examples and further comprising:

automatically generating additional web service instances, each with an additional set of assigned computing system resources that is different from, and smaller than, the first set of computing system resources.

Example 16 is the computer implemented method of any or all previous examples and further comprising:

automatically generating the plurality of different request groups by applying the grouping criteria to received service requests to identify sets of similar service requests based on the grouping criteria and generating a request group for each set of similar service requests.

Example 17 is a computing system, comprising:

a first web service instance having a first set of assigned computing system resources that implement request servicing logic configured to respond to web service requests;

a second web service instance having a second set of assigned computing system resources that is different from, and smaller than, the first set of assigned computing system resources, the second set of assigned computing system resources implementing the request servicing logic that is configured to respond to the service requests;

request group identifier logic that receives a service request and identifies a request group, of a plurality of different request groups, to which the service request belongs, based on a set of grouping criteria;

metric comparison logic that compares a performance metric value corresponding to the identified request group to a metric threshold value and that generates a comparison signal indicative of a result of the comparison; and a controller that generates a default instance control signal to send the service request to the first web service instance for execution when the comparison signal has a first value, and that generates a sandbox instance control signal to send the service request to the second web service instance for execution when the comparison signal has a second value.

Example 18 is the computing system of any or all previous examples wherein the first and second sets of assigned computing system resources are configured so that execution of the service request on the first web service instance is unaffected by execution of another service request, that operates on different data, on the second web service instance.

Example 19 is the computing system of any or all previous examples and further comprising:

a sandbox instance generator configured to automatically generate additional web service instances, each with an additional set of assigned computing system resources that is different from, and smaller than, the first set of computing system resources.

Example 20 is the computing system of any or all previous examples and further comprising:

metric detector logic configured to detect a value of the performance metric corresponding to execution of the service request; and metric update logic configured to update the performance metric value corresponding to the identified request group based on the detected value of the performance metric corresponding to execution of the service request.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
at least one processor; and
memory storing instructions executable by the at least one processor, wherein the instructions, when executed, cause the computing system to:
receive a service request for a web service and identify a request group, of a plurality of different request groups, to which the service request belongs, based on a set of grouping criteria;
compare a performance metric value corresponding to the identified request group to a metric threshold value and generate a comparison signal indicative of a result of the comparison;
generate a default instance control signal to send the service request to a first web service instance for execution when the comparison signal has a first value, the first web service instance having a first set of assigned computing system resources that implement request servicing logic configured to respond to the service request; and
generate a sandbox instance control signal to send the service request to a second web service instance for execution when the comparison signal has a second value, the second web service instance having a second set of assigned computing system resources that is different from, and smaller than, the first set of assigned computing system resources, the second set of assigned computing system resources implementing the request servicing logic that is configured to respond to the service request.

2. The computing system of claim 1 wherein the instructions cause the computing system to:
detect a value of the performance metric corresponding to execution of the service request.

3. The computing system of claim 2 wherein the wherein the instructions cause the computing system to:
update the performance metric value corresponding to the identified request group based on the detected value of the performance metric corresponding to execution of the service request.

4. The computing system of claim 3 and further comprising the first and second web service instances, wherein the first and second sets of assigned computing system resources are configured so that execution of the service request, that operates on a first portion of data, on the first web service

19 instance is unaffected by execution of another service request, that operates on a different portion of data, on the second web service instance.

5. The computing system of claim 3 wherein the instructions cause the computing system to:
automatically generate additional web service instances, each with an additional set of assigned computing system resources that is different from, and smaller than, the first set of computing system resources.

6. The computing system of claim 3 wherein the instructions cause the computing system to:
access a set of grouping rules and generate the plurality of different request groups by applying the grouping criteria in each of the grouping rules to received service requests to identify sets of similar service requests based on the grouping criteria and generating a request group for each set of similar service requests.

7. The computing system of claim 6 wherein the instructions cause the computing system to generate an additional grouping rule that defines an additional request group when the request group identifier logic identifies that a service request is received that does not belong to a request group, based on the grouping criteria.

8. The computing system of claim 1 wherein the instructions cause the computing system to compare a plurality of different performance metric values corresponding to the identified request group to a plurality of different, corresponding metric threshold values and generate the comparison signal based on results of the comparisons.

9. The computing system of claim 8 wherein the instructions cause the computing system to provide a plurality of different metric detectors each configured to detect a different one of the plurality of different performance metric values corresponding to execution of the service request.

10. The computing system of claim 9 wherein the instructions cause the computing system to update the plurality of different performance metric values corresponding to the identified request group based on the plurality of different detected performance metric values corresponding to execution of the service request.

11. A computer implemented method, comprising:
receiving a service request for a web service;
identifying a request group, of a plurality of different request groups, to which the service request belongs, based on a set of grouping criteria;
comparing a performance metric value corresponding to the identified request group to a metric threshold value and generating a comparison signal indicative of a result of the comparison;
generating a default instance control signal to send the service request to a first web service instance for execution when the comparison signal has a first value, the first web service instance having a first set of assigned computing system resources that implement request servicing logic configured to respond to the service request; and
generating a sandbox instance control signal to send the service request to a second web service instance for execution when the comparison signal has a second value, the second web service instance having a second set of assigned computing system resources that is different from, and smaller than, the first set of assigned computing system resources, the second set of assigned computing system resources implementing the request servicing logic that is configured to respond to the service request.

20

12. The computer implemented method of claim 11 and further comprising:
detecting a value of the performance metric corresponding to execution of the service request; and
updating the performance metric value corresponding to the identified request group based on the detected value of the performance metric corresponding to execution of the service request.

13. The computer implemented method of claim 12 wherein comparing comprises:
comparing a plurality of different performance metric values corresponding to the identified request group to a plurality of different, corresponding metric threshold values and wherein generating the comparison signal comprises generating the comparison signal based on results of the comparisons.

14. The computer implemented method of claim 13 wherein detecting a value of the performance metric comprises detecting a plurality of different performance metric values corresponding to execution of the service request and wherein updating the performance metric value corresponding to the identified request group comprises updating a plurality of different performance metric values corresponding to the identified request group based on the plurality of different detected performance metric values corresponding to execution of the service request.

15. The computer implemented method of claim 12 and further comprising:
automatically generating additional web service instances, each with an additional set of assigned computing system resources that is different from, and smaller than, the first set of computing system resources.

16. The computer implemented method of claim 12 and further comprising:
automatically generating the plurality of different request groups by applying the grouping criteria to received service requests to identify sets of similar service requests based on the grouping criteria and generating a request group for each set of similar service requests.

17. A computing system, comprising:
at least one processor; and
memory storing instructions executable by the at least one processor, wherein the instructions, when executed, provide:
a first web service instance having a first set of assigned computing system resources that implement request servicing logic configured to respond to web service requests;
a second web service instance having a second set of assigned computing system resources that is different from, and smaller than, the first set of assigned computing system resources, the second set of assigned computing system resources implementing the request servicing logic that is configured to respond to the service requests;
request group identifier logic that receives a service request and identifies a request group, of a plurality of different request groups, to which the service request belongs, based on a set of grouping criteria;
metric comparison logic that compares a performance metric value corresponding to the identified request group to a metric threshold value and that generates a comparison signal indicative of a result of the comparison; and
a controller that generates a default instance control signal to send the service request to the first web service instance for execution when the comparison signal has a first value, and that generates a sandbox instance control signal to send the service request to the second web service instance for execution when the comparison signal has a second value.

18. The computing system of claim 17 wherein the first and second sets of assigned computing system resources are configured so that execution of the service request on the first web service instance is unaffected by execution of another service request, that operates on different data, on the second web service instance.

19. The computing system of claim 18 wherein the instructions, when executed, provide:
   a sandbox instance generator configured to automatically generate additional web service instances, each with an additional set of assigned computing system resources that is different from, and smaller than, the first set of computing system resources.

20. The computing system of claim 19 wherein the instructions, when executed, provide:
   metric detector logic configured to detect a value of the performance metric corresponding to execution of the service request; and
   metric update logic configured to update the performance metric value corresponding to the identified request group based on the detected value of the performance metric corresponding to execution of the service request.

* * * * *